United States Patent [19]

Matsui et al.

[11] Patent Number: 5,075,175
[45] Date of Patent: Dec. 24, 1991

[54] COMPOSITE BAR STRUCTURES OF INTERLOCKED MULTIPLE MEMBERS

[75] Inventors: Shigetomo Matsui, Higashiosaka; Takeshi Yamada, Kobe; Yasuhiro Kumon, Kobe; Makoto Ryoji, Kobe, all of Japan

[73] Assignee: Kawasaki Jukogyo Kabushiki Kaisha, Kobe, Japan

[21] Appl. No.: 378,617

[22] Filed: Jul. 12, 1989

[30] Foreign Application Priority Data

Jul. 14, 1988 [JP] Japan .................. 63-173921

[51] Int. Cl.⁵ .............................. B32B 15/02
[52] U.S. Cl. ........................ 428/582; 428/586; 428/599; 428/609; 428/614
[58] Field of Search ............ 428/582, 586, 599, 609, 428/614

[56] References Cited

U.S. PATENT DOCUMENTS

| | | | |
|---|---|---|---|
| 309,439 | 12/1884 | Chillingworth et al. | 428/609 |
| 312,485 | 2/1885 | Makin | 428/609 |
| 1,209,948 | 12/1916 | Dodds | 428/609 |
| 1,610,945 | 12/1926 | Goldsmith et al. | 428/609 |
| 1,622,825 | 3/1927 | Goldsmith et al. | 428/609 |
| 1,680,369 | 8/1928 | Dugan | 428/609 |
| 1,692,529 | 11/1928 | Zagorski | 428/609 |
| 1,939,768 | 12/1933 | De Bats | 428/609 |
| 2,157,456 | 5/1939 | Koyemann | 428/609 |
| 2,236,257 | 3/1941 | Borchers | 428/609 |
| 2,262,074 | 11/1941 | Welty | 428/609 |
| 2,285,583 | 6/1942 | Jennings et al. | 428/609 |
| 2,490,548 | 12/1949 | Schultz | 428/609 |
| 2,505,937 | 5/1950 | Bernard | 428/582 |
| 2,793,571 | 5/1957 | Way et al. | 428/609 |
| 2,888,742 | 6/1959 | Stumbock | 428/609 |
| 3,529,858 | 9/1970 | Haller | 428/609 |
| 3,691,340 | 9/1972 | Landis et al. | 428/609 |
| 4,005,991 | 2/1977 | Uebayasi et al. | 428/609 |
| 4,154,900 | 5/1979 | Kaku et al. | 428/609 |

FOREIGN PATENT DOCUMENTS

| | | | |
|---|---|---|---|
| 55-139540 | 10/1980 | Japan . | |
| 61-161796 | 7/1986 | Japan | 428/609 |

*Primary Examiner*—R. Dean
*Assistant Examiner*—David Schumaker
*Attorney, Agent, or Firm*—Wenderoth, Lind & Ponack

[57] ABSTRACT

A composite bar structure is composed of at least outer and inner members extending parallelly in the longitudinal direction of the structure and joined mechanically at an interface therebetween in an interlocked. The structure is fabricated by forming a plurality of projections on the inner member over the entire interface, preparing the outer member in a tubular shape to readily encompass the inner member, relatively positioning the members to place the inner member within the outer member in telescoped state, and applying a constrictive compression force on the outer member so that it undergoes plastic deformation and reduction in diameter, whereby the projections bite into the inner surface of the outer member. The members are thus joined tightly to form the integral composite bar structure.

5 Claims, 6 Drawing Sheets

COMPOSITE BAR STRUCTURES OF INTERLOCKED MULTIPLE MEMBERS

BACKGROUND OF THE INVENTION

This invention relates generally to interlocked multiple-member composite structures and more particularly to the field of art of various shaped articles of bar shape each formed by mechanically joining at least an outer member and an inner member into a unitized structure. Examples of such structures are: screw seats or washers and seal rings of parts of mechanical apparatuses and devices; tubular structures such as steel pipe piles for architectural foundations; and column-form structural materials having cross-sections of shapes such as a circle, angle, and H-section.

More specifically, the invention concerns composite bar structures of interlocked multiple members, each bar structure comprising, for example, an aluminum alloy tubular outer member and a column-shaped inner member or core of a metal such as steel, the outer and inner members being joined mechanically at their mating interface in an interlocking manner to produce an integral bar structure. A method of producing the bar structures comprises forcibly stratifying the tubular outer member relative to the inner member which has been provided on its surface in its longitudinal and circumferential directions with a large number of projections formed integrally thereon by a process such as rolling, whereby the projections on the inner member engage interlockingly with corresponding recesses thus formed in the inner wall surface of the outer member to form a unitary bar structure.

The outer and inner members can be thus joined by a plastic deformation method such as passing the tubular outer member, with the inner member positioned therein in a telescope state, through a die by drawing or extruding, thereby to cause a shrinkage of its diameter or causing the inner member to undergo an expansion of its diameter.

As is known, spring means for functions such as absorption of vibrations and oscillations are widely used in various machines and apparatuses. For retaining these spring means, spring seats or retainers are used Also, screw or bolt seats such as washers are used for preventing loosening of the screws or bolts. Similarly, seal rings and the like are widely used. In the field of civil engineering and architecture, foundation piles are required for constructing buildings and like structures on weak ground In order to ensure ample strength and durability of such pilings, particularly with respect to corrosion resistance over a long period of time, so-called steel pipe piles and the like are used.

These items of hardware and construction materials are frequently liable to become defective by deformation due to impact, vibration, or thermal behavior with the passage of time. In order to avoid variations with time of the functional capacities of these materials, there is an increasing trend toward the use of multiple-member composite bar structures fabricated by joining unitarily outer and inner members of different materials respectively suitable for their characteristics such as mechanical strength and corrosion resistance. These outer and inner members have heretofore been joined by methods such as explosion pressure bonding and shrinkage fitting.

However, by these known methods of joining, the joining between the outer and inner members at their interface is a metallurgical bonding or a smooth pressure joining. As a consequence, in the case of repeated thermal action over a long time or the application of a great load, slippage may occur between the outer and inner members in the longitudinal or circumferential directions, whereby the structure can no longer perform as originally designed Furthermore, a large number of process steps are required in the production of these known structures, and the control and management of these steps are considerably complicated. As a result, the production cost of these known structures becomes high.

SUMMARY OF THE INVENTION

It is an object of this invention to overcome the above described problems encountered in the prior art with regard to composite bar structures for articles such as screw seats and washers, spring retaining seats, and steel tube piles, and to the production thereof by providing improved bar structures of interlocked multiple members. The improved bar structures can be produced at low production cost, including low labor cost, and the respective characteristics of the multiple members are fully and advantageously utilized. The original performance and functional capacity of each bar structure are preserved unchanged with the passage of time, and by providing a method of producing these bar.

According to this invention, there is provided a composite bar structure comprising at least an outer member and an inner member, these members extending parallelly in the longitudinal direction of the structure and being joined together mechanically at an interface therebetween by the interlocking of a plurality of projections formed integrally on one member in the longitudinal and circumferential directions with respective recesses formed in the other member at the interface over the entire expanse thereof. In a particular form of the composite bar structure, each of the projections has at its distal end an overhanging head which interlockingly fits into a corresponding recess in the other member, whereby an anchor bond is obtained between the joined members.

Such composite bar structure composed of at least outer and inner members extending parallelly in the longitudinal direction of the structure and joined together mechanically at an interface therebetween is produced by a method that comprises forming a plurality of projections or, alternatively, recesses on the surface of the inner member in the longitudinal and circumferential directions thereof integrally therewith, preparing the outer member in a tubular shape to readily encompass the inner member, relatively positioning the members to place the inner member within the outer member in a telescoped state, and applying on the outer member a constrictive compressive force to cause the same to undergo plastic deformation and reduction in diameter, thereby to cause interlocking engagement of the projections or recesses with respective recesses or projections, whereby the members are joined tightly to form the integral composite bar structure.

The nature, utility, and further features of this invention will become more clearly understood from the following detailed description with respect to preferred embodiments of the invention when read in conjunction with the accompanying drawings, briefly described below.

DETAILED DESCRIPTION OF THE INVENTION

Figure 1:
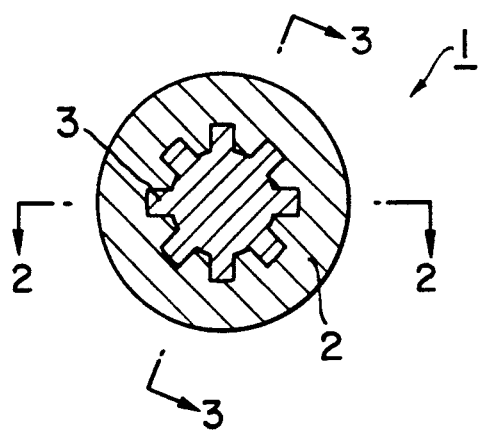
FIG. 1 is a cross section of one example of the composite bar structure according to this invention.
Figure 2:
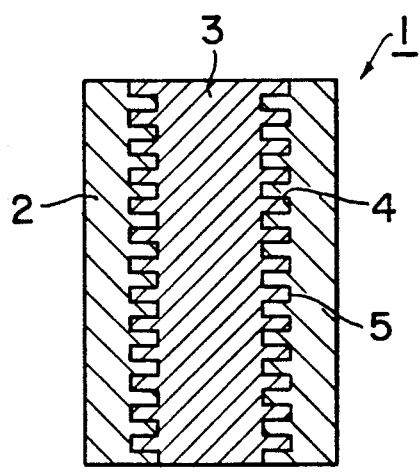
FIGS. 2 and 3 are longitudinal sections respectively taken along the planes indicated by lines 2—2 and 3—3 in FIG. 1.
Figure 3:
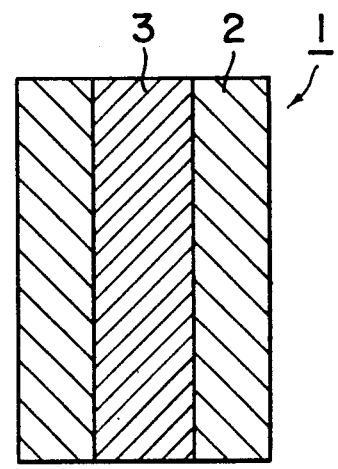

The composite bar structure 1 of interlocked double members as shown in FIGS. 1, 2, and 3 constitutes a basic embodiment of this invention and can be used for parts such as various rotor shafts of machines and other devices. This structure 1 comprises a tubular outer member 2 made of an aluminum alloy and a steel inner member or core 3 interlocked therewith. These two members 2 and 3 are mechanically and integrally joined by the tight engagement of a large number of pin-like projections 5 formed integrally with and radiating from the entire cylindrical surface of the core 3 in a plurality of recesses 4 formed in the inner wall surface of the outer member 2.

Therefore, when this bar structure 1- of interlocked double members is used as a shaft or spindle, it possesses high resistance with respect to oscillations and vibrations in its axial and circumferential directions during operation. Thus there is no possibility of slippage, shearing, deformation, or other adverse consequences.

Figure 4:
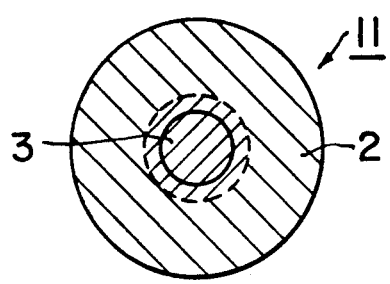
FIG. 4 is a cross section of another example of the composite bar structure of the invention.
Figure 5:
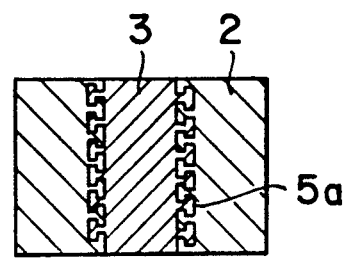
FIG. 5 is a longitudinal section of the structure shown in FIG. 4.

In a modification of the above described example as illustrated in FIGS. 4 and 5, the projections 5a, projecting radially outward from the entire cylindrical surface of the core 3 respectively have Tee-shaped heads at their outer ends, which form overhanging parts that bite deeply into the inner parts of the outer member 2. By this interlocking mode, the resulting integral structure 11 has a high resistance relative to slippage, shearing and deformation in the radial direction arising from causes such as thermal expansion at the time of temperature variations.

Figure 6:
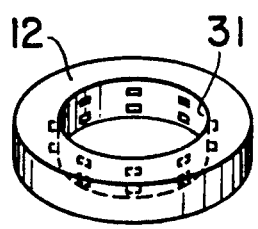
FIGS. 6 and 7 are perspective views respectively showing examples of practical forms of the composite bar structure.
Figure 7:
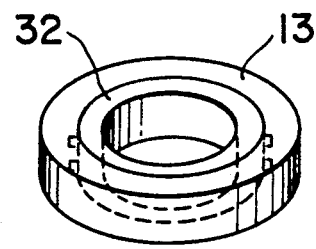

The example shown in FIG. 6 illustrates a mode of practice of the invention wherein either of the bar structures 1 and 11 described above is cut into pieces 12 of specific short cylinder or ring shape having a bore 31 to serve as screw seats or washers. In the example shown in FIG. 7, the combination of the outer and inner members 13, 32 is reversed, the inner member being made of an aluminum alloy. This structure is suitable for use as a seal ring in machine parts.

Figure 8:
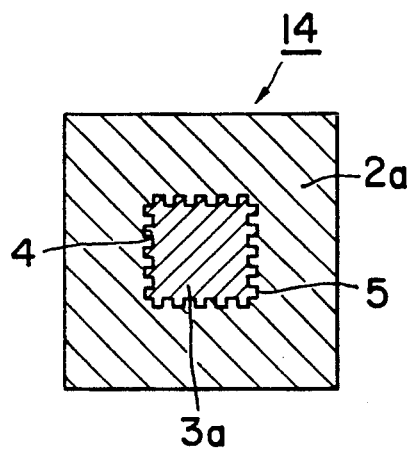
FIGS. 8 through 15 are cross sections respectively showing other examples of the composite bar structure of the invention.

FIG. 8 illustrates an example wherein the bar structure 14 is in the shape of a column of square cross section. This bar structure 14 comprises an aluminum alloy outer member 2a of tubular shape of a square cross section and an inner member or core 3a of square column shape interlockingly and coaxially fitted in the outer member 2a. These two members 2a and 3a are tightly and unitarily joined together by the mechanical interlocking of a large number of projections 5 of the core 3a and respective recesses 4 in the outer member 2a similarly as in the above described examples. Thus, relative slippage, shearing or deformation between these two members is prevented.

Figure 9:
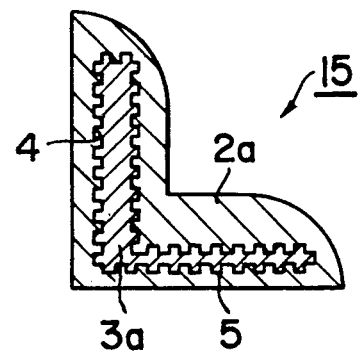

In another mode of practice of the invention as illustrated in FIG. 9, the bar structure 15 has the cross section of an angle member in which both the outer member 2a and the inner core 3a have L-shaped cross sections. Similarly as in the preceding examples, these outer and inner members 2a and 3a are tightly and integrally joined together by the mechanical interlocking of projections 5 of the core 3a with respective recesses 4 in the outer member 2a.

Figure 10:
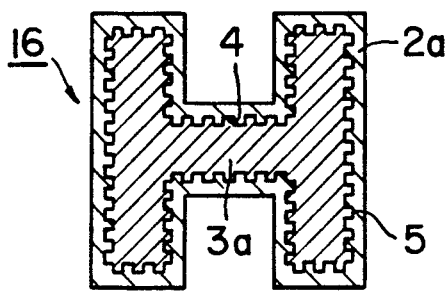
Figure 11:
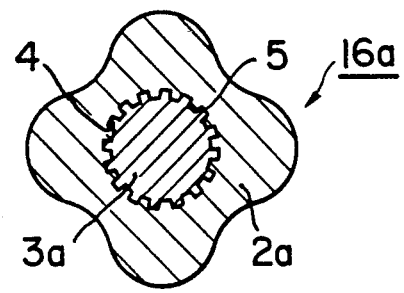

In still another mode of practice as shown in FIG. 10, the bar structure 16 is in the form of an H-beam comprising an outer member 2a and a core 3a mechanically joined by the interlocking of projections 5 similarly as in the preceding examples. In a further mode of practice as shown in FIG. 11, the bar structure 16a comprises an aluminum outer member 2a of flower-shaped outer contour in cross section and a steel core 3a of circular cross section, which are interlockingly joined as in the preceding examples. These bar structures described above and shown in FIGS. 8 to 11 are suitable for various uses such as structural materials for architectural construction and foundation piles.

Figure 12:
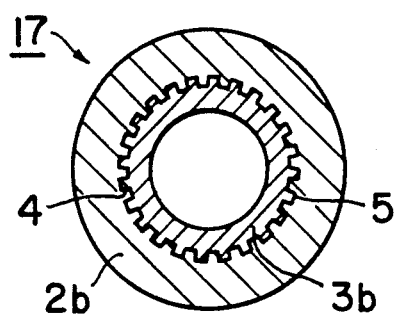
Figure 13:
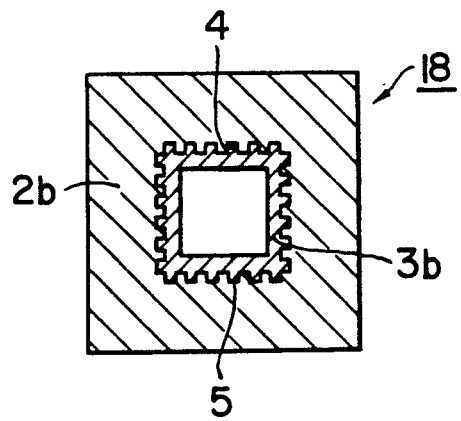

FIGS. 12 and 13 illustrate applications of this invention to tubular bar structures 17 and 18 respectively of circular and square outer contours in cross section with longitudinally extending hollow interiors of respective circular and square cross sections. These structures also comprise outer members 2b and inner members or cores 3b, which are integrally joined similarly as in the preceding examples.

Figure 14:
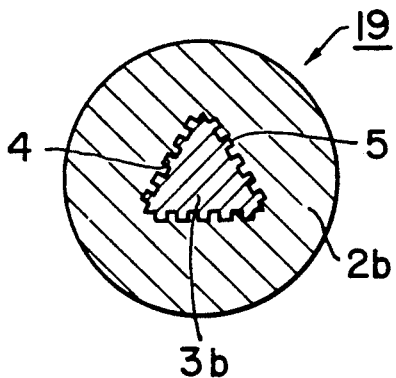
Figure 15:
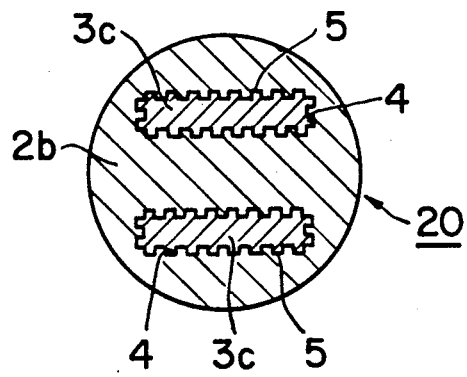
Figure 16:
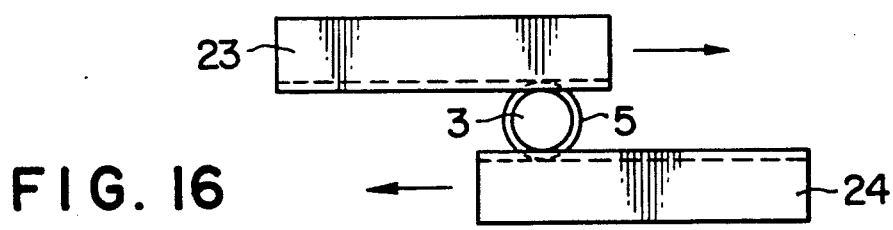
FIG. 16 is a side view indicating a process of rolling an inner member with flat dies to form projects on the surface thereof.
Figure 17:
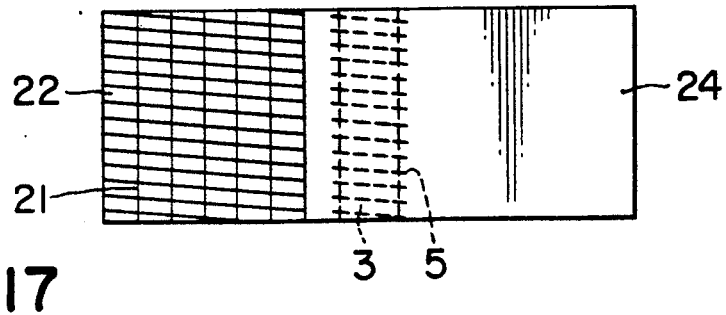
FIG. 17 is a plan view orthogonal to FIG. 16 with one die removed.
Figure 18:
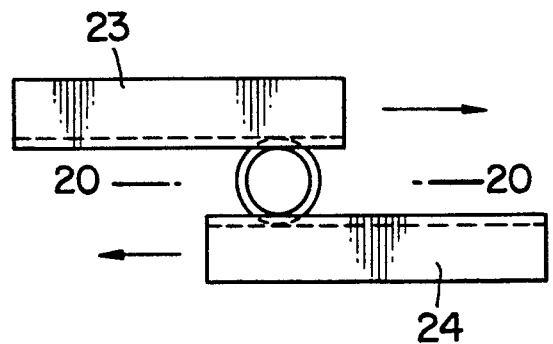
FIG. 18 is a side view indicating a process of rolling with flat dies an inner member to have overhang parts on its projections.
Figure 19:
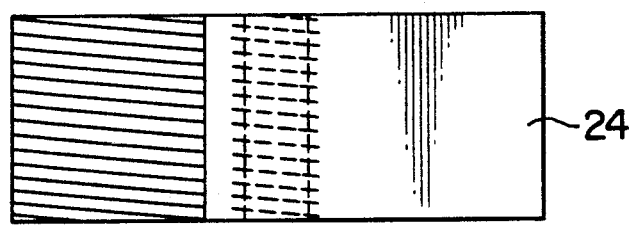
FIG. 19 is a plan view orthogonal to FIG. 18.
Figure 20:
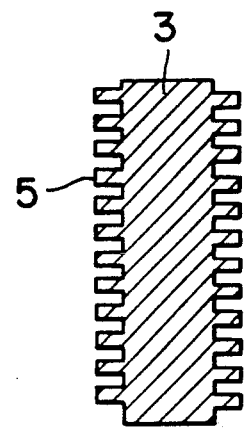
FIG. 20 is a longitudinal section taken along the plane indicated by line 20—20 in FIG. 18.

Further examples of application of the invention are shown in FIGS. 14 and 15. The outer members 2b of these bar structures 19 and 20 have circular outer contours in cross section. The core 3b of the bar structure 19 has a triangular cross section, while the core of the bar structure 20 comprises two spaced-apart and parallel inner members 3c, each of rectangular cross section. In each of these bar structures 19 and 20, the outer member and the core are integrally joined as in the preceding examples.

The bar structures of interlocked double members of the above described construction are produced as described below with reference to FIGS. 16 to 36.

First, as shown in FIGS. 16 to 20, a cylindrical inner or core member 3 of circular cross section is rolled between planar rolling dies 23 and 24 having on their working surfaces longitudinal grooves 21 and transverse grooves 22 formed with a slight inclination, thereby to form pin-shaped projections 5, in a helical pattern on the cylindrical surface of the core member 3.

Figure 21:
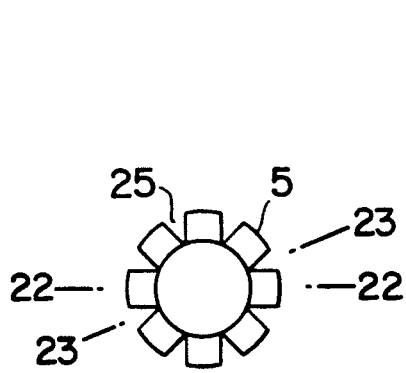
FIG. 21 is an end view of an inner member which has been rolled to form projections.
Figure 22:
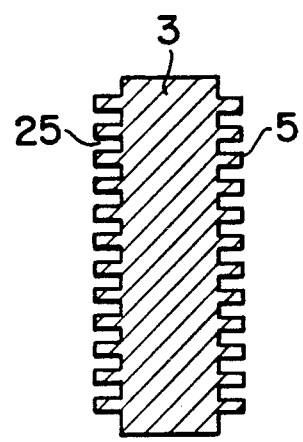
FIGS. 22 and 23 are longitudinal sections respectively taken along the planes indicated by lines 22—22 and 23—23 in FIG. 21.
Figure 23:
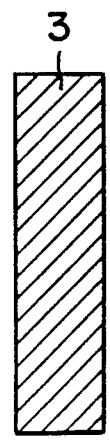
Figure 24:
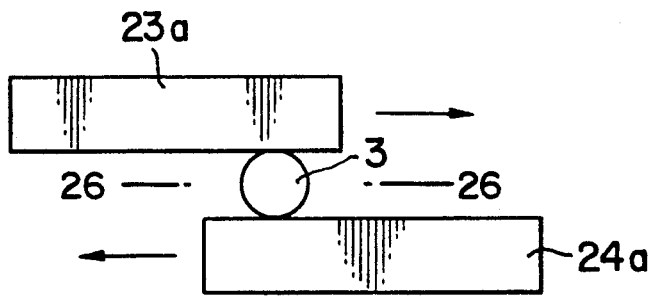
FIG. 24 is a side view indicating a process of producing by rolling projections with overhangs on an inner member.
Figure 25:
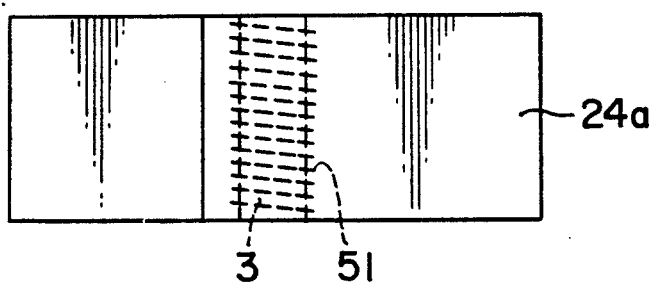
FIG. 25 is a plan view orthogonal to FIG. 24.
Figure 26:
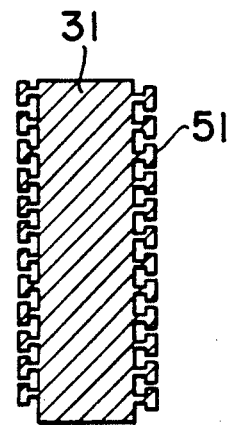
FIG. 26 is a longitudinal section taken along the plane indicated by line 26—26 in FIG. 24.

A core member 3 formed in the above described manner has grooves 25 formed between the projections 5 as shown in FIGS. 21 and 22. Then, by imparting a pressing and upsetting action to the tips of all projections 5 of the core 3 by means of flat dies 23a and 23a with smooth working surfaces as shown in FIGS. 24 and 25, a core member 31 having projections 51 with T-shape overhanging heads at their tips can be produced by rolling. The inner core 3 or 31 can also be produced by an extruding process or a die drawing process.

The inner core 3 or 31 fabricated in the above described manners is then mechanically joined to a tubular outer member 2 to form a unitary bar structure as described below.

Figure 27:
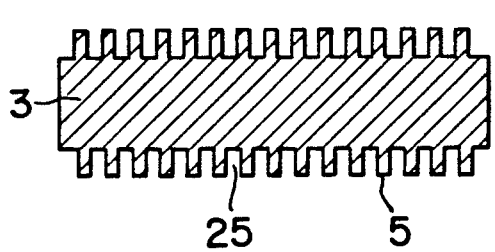
FIG. 27 is a longitudinal section of an inner member to be inserted into an outer member.
Figure 29:
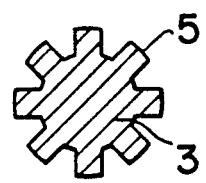
FIG. 29 is a cross section of the same inner member.
Figure 28:
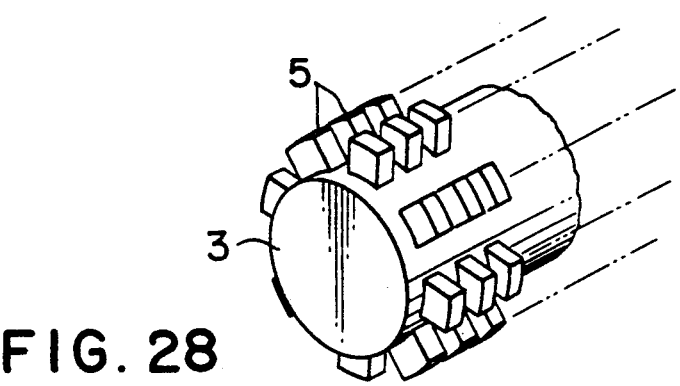
FIG. 28 is a partial perspective view of the same inner member.
Figure 30:
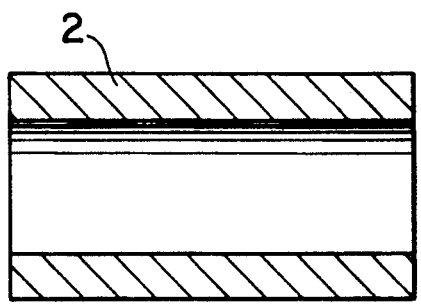
FIG. 30 is a longitudinal section showing an outer member to fit around the inner member in a telescoped state.
Figure 31:
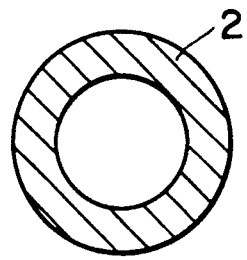
FIG. 31 is a cross section of the same outer member.
Figure 32:
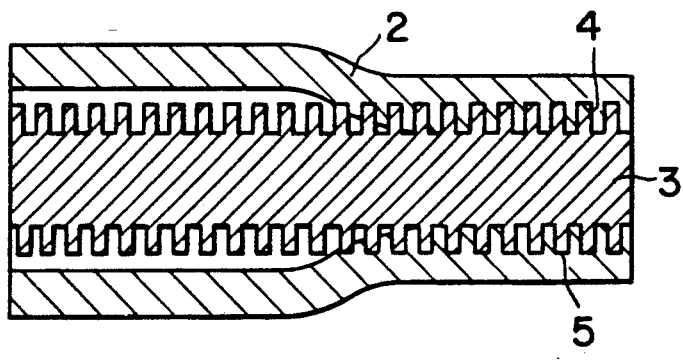
FIG. 32 is a longitudinal section indicating the manner in which the outer member shown in FIG. 30 is caused by its being drawn through a die to undergo plastic deformation and contraction of diameter relative to the inner member shown in FIGS. 27, 28, and 29.
Figure 33:
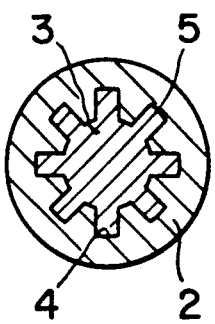
FIG. 33 is a cross section of the composite bar section which has been fabricated as a unitary structure by the process indicated in FIG. 32.

A tubular outer member 2 as shown in FIGS. 30 and 31 of an inner diameter greater by a specific allowance than the outer diameter, including the projections 5, of the core 3 as shown in FIGS. 27, 28, and 29 is prepared. Then, as shown in FIGS. 32 and 33, this outer member 2 and the inner core 3 are placed in a relatively superposed or telescoped state, and, by means of a suitable die device such as squeeze rollers, the outer member 2 is pressed inward from the outside to be pressed against the outer surface of the core 3, thereby to undergo plastic deformation and contraction of diameter. As a consequence, the projections 5 of the core 3 are thrust in by a biting action into the inner wall surface of the outer member 2 as shown in FIG. 33, whereby the two parts are interlockingly joined into an integral bar structure 1 as shown in FIGS. 1, 2, and 3.

Figure 34:
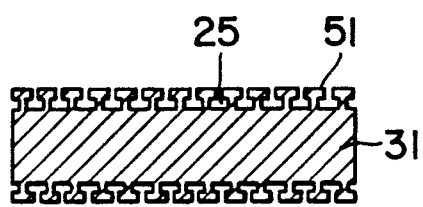
FIG. 34 is a longitudinal section of an inner member having projections with overhanging heads formed at their tips.
Figure 35:
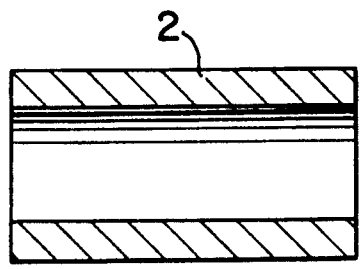
FIG. 35 is a longitudinal section of an outer member to fit around the inner member shown in FIG. 34.
Figure 36:
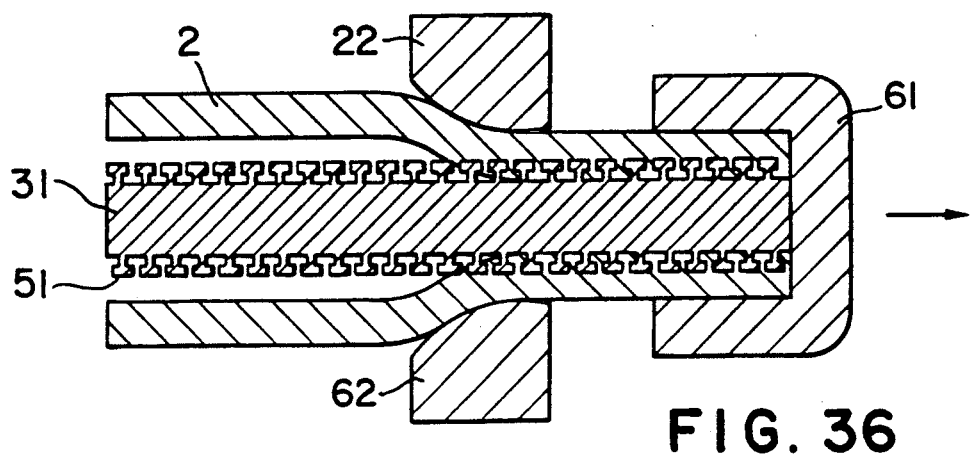
FIG. 36 is a longitudinal section indicating the manner in which the outer member shown in FIG. 35 is caused by its being drawn through a die to undergo plastic deformation and contraction of its diameter relative to the inner member shown in FIG. 34.

In the case of an inner core 31 formed to have projections 51 with overhanging head parts at their tips, this core 31 and an outer member 2 of an inner diameter greater by a specific allowance than the outer overall diameter of the projections 51 as shown in FIGS. 34 and 35 are placed in a mutually superposed state. Then, as shown in FIG. 36, one end of the outer member 2 is clamped by a clamper 61 and drawn in the direction of the arrow to cause the outer member 2 to pass through a stationary die 62 and thus undergo plastic deformation to be constricted in diameter, thereby imparting a squeezing action relative to the core 31. As a consequence, the projections 51 are forced to bite into the inner surface of the outer member 2, whereby the two members 2 and 31 are mechanically joined into a unitary bar structure as shown in FIGS. 4 and 5.

The above described process can be applied to produce bar structures of various kinds some of which are shown in FIGS. 8 to 15. While the invention has been described above with respect to examples of bar structures each comprising two members joined integrally together, it will be evident that the principle of the invention is applicable equally to bar structures comprising more than two members. Furthermore, prior to the process step of mechanically forcing the outer member to contract in diameter against the inner or core member, a suitable industrial adhesive or an anticorrosive composition for preventing electrolytic (galvanic) corrosion can be applied to the respective surfaces of the two members to be interlockingly engaged along the interface therebetween.

Because of the construction of the bar structure of this invention, wherein an outer member and a core member have been joined in an interlocking manner to form a unitary structure as described hereinabove, the bar structure is suitable for a wide range of applications such as screw and bolt washers, seal rings, and steel pipe piles for construction work. An advantageous feature of the bar structure of the invention is that it has strong resistance to deformation such as relative slippage between the outer and inner members in the circumferential direction or the longitudinal direction due to vibrations, oscillations, or thermal action during use. Thus the original performance and functional capacity of the bar structure can be preserved indefinitely with the passage of time. A still further advantage afforded by this invention is that the process as described above of producing the bar structures requires less process time (man-hours) than known processes such as explosive forming or explosion pressure fitting and shrinkage fitting. Moreover, the process can be carried out at lower cost to produce a stronger joint between the outer and inner members.

What is claimed is:
1. A composite bar structure comprising:
at least an outer member an inner member, said members extending parallely in a longitudinal direction of said structure; and
said members being joined together mechanically at an interface therebetween by the interlocking of a plurality of projections formed integrally on one said member and spaced in the longitudinal and circumferential directions with respective recesses formed in the other said member at said interface over the entire expanse thereof, said interlocking projections and recesses being of a configuration and having mechanical characteristics resulting from the application of a constrictive compressive force to said outer member sufficient to cause said outer member to undergo plastic deformation and reduction in size and to cause said projections in said one member to penetrate into said other member and to form said recesses therein.

2. A composite bar structure as claimed in claim 1 wherein each of said projections has, at a distal tip thereof, an overhanging head, and the respective recess has a corresponding shape, whereby a tight joint is obtained between the members.

3. A composite bar structure as claimed in claim 1 wherein said inner member is in the shape of a solid bar.

4. A composite bar structure as claimed in claim 1 wherein said inner member is of tubular shape.

5. A composite bar structure as claimed in claim 1 wherein said inner member comprises at least two spaced-apart parallel bars.

* * * * *